United States Patent
Gabor

[15] 3,663,880
[45] May 16, 1972

[54] APPARATUS FOR CONTROLLING THE RELATIVE POSITION BETWEEN TWO RELATIVELY MOVABLE MEMBERS

[72] Inventor: Andrew Gabor, Danville, Calif.
[73] Assignee: Diablo Systems, Inc., Hayward, Calif.
[22] Filed: Sept. 14, 1970
[21] Appl. No.: 71,894

[52] U.S. Cl..............................................318/603, 318/608
[51] Int. Cl. .......................................................G05b 1/01
[58] Field of Search..........................................318/603, 608

[56] References Cited

UNITED STATES PATENTS

| 3,512,060 | 5/1970 | Floyd.....................................318/603 |
| 3,548,282 | 12/1970 | Schiller...............................318/608 X |
| 3,259,819 | 7/1966 | Heiser.................................318/661 X |

*Primary Examiner*—Benjamin Dobeck
*Attorney*—Flehr, Hohbach, Test, Albritton & Herbert

[57] ABSTRACT

Apparatus for bringing the read/write heads of a magnetic disk unit to a stop over a predetermined track where quadrature position signals are utilized to provide a symmetrical logic signal which in conjunction with a difference count provides the coincidence indication of the stopping point.

11 Claims, 12 Drawing Figures

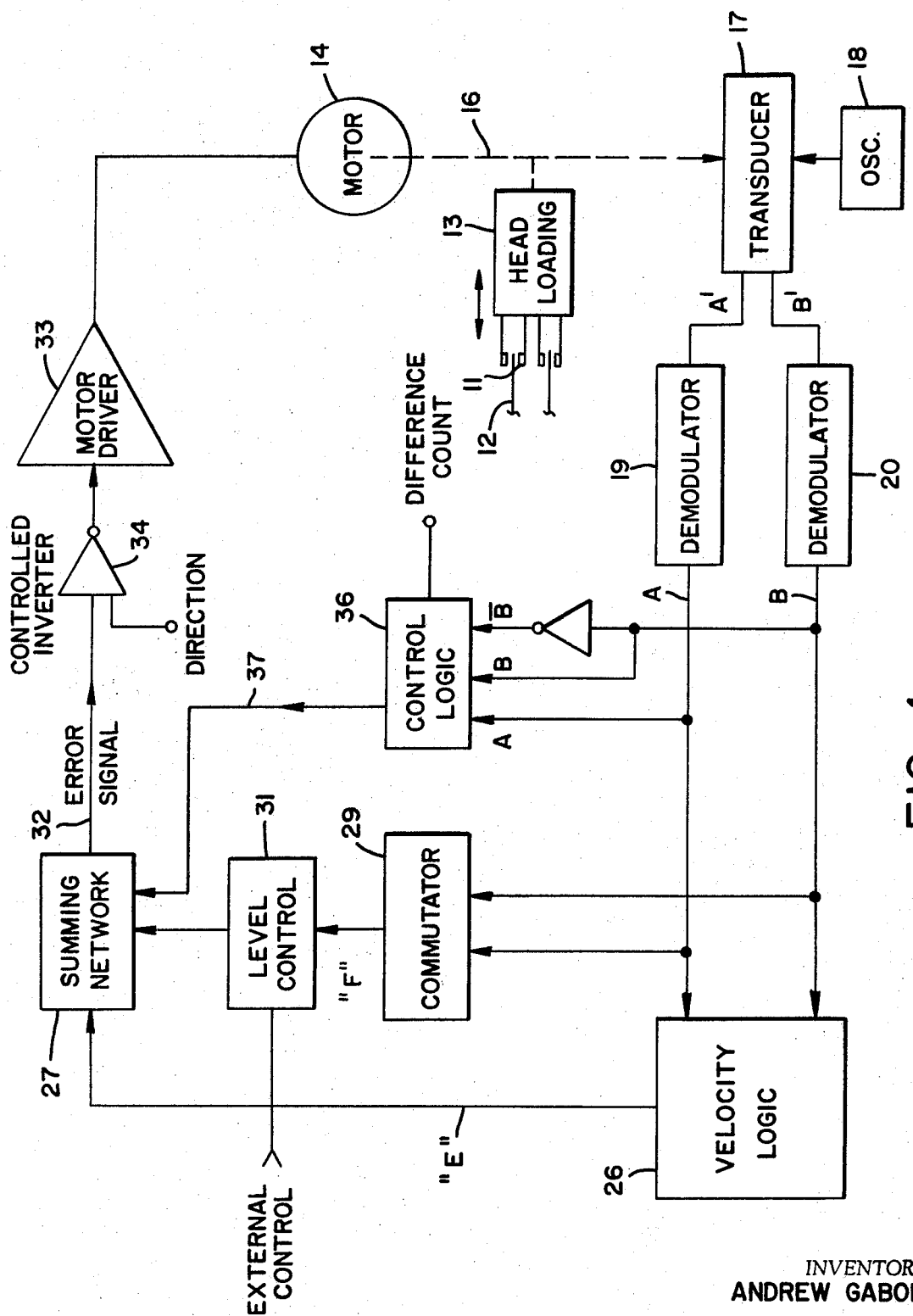
FIG_1

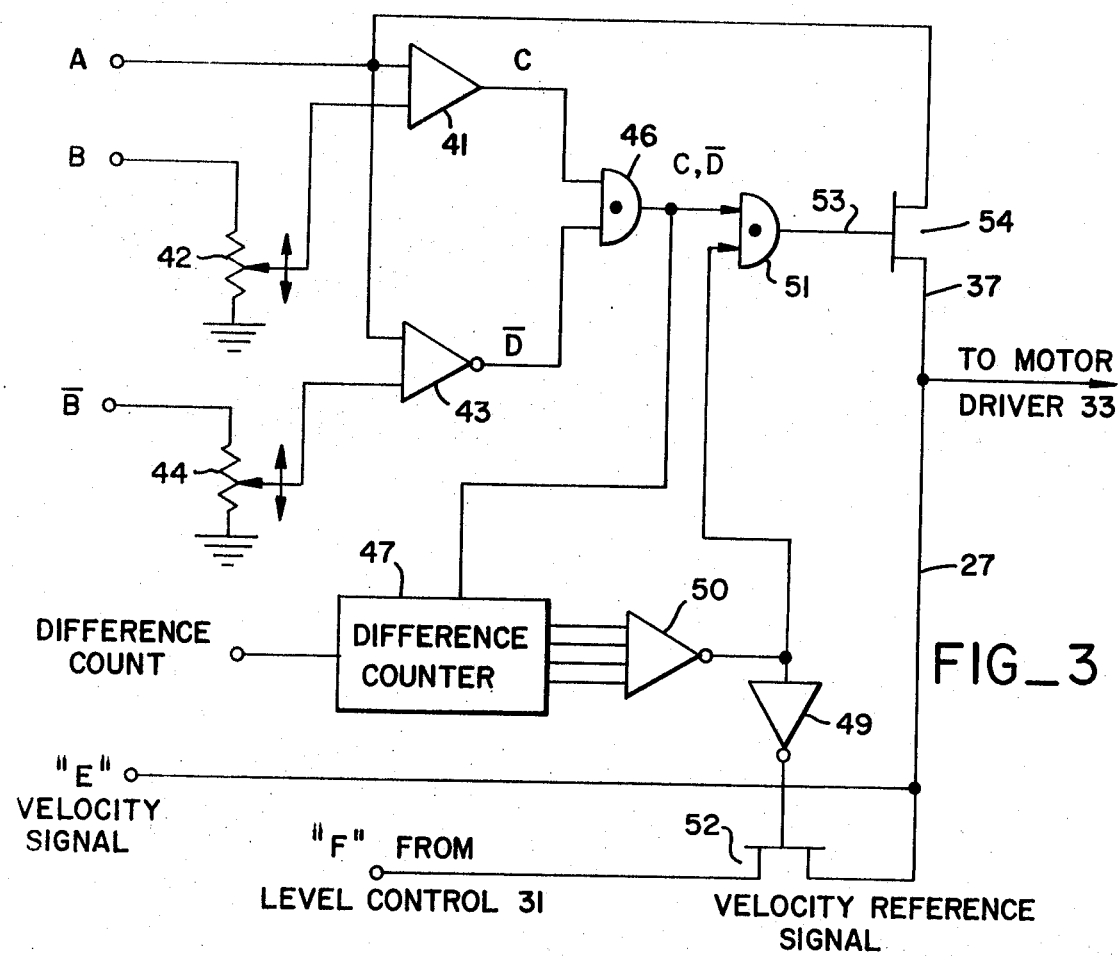
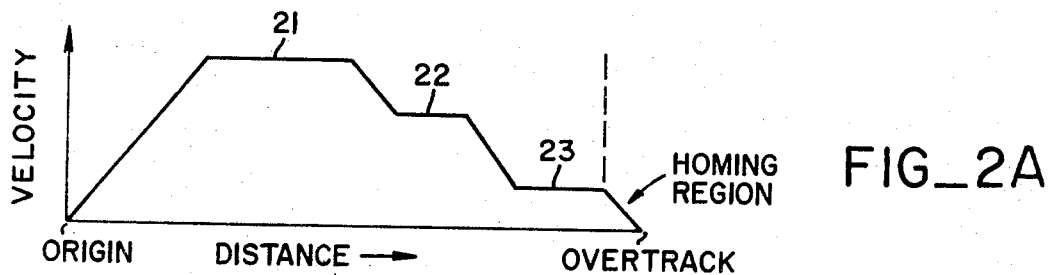
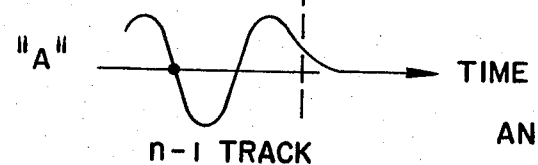
INVENTOR.
ANDREW GABOR
BY Flehr, Hohbach, Test, Albritton & Herbert
ATTORNEYS Patented May 16, 1972
3,663,880
3 Sheet—Sheet 3
FIG_4A
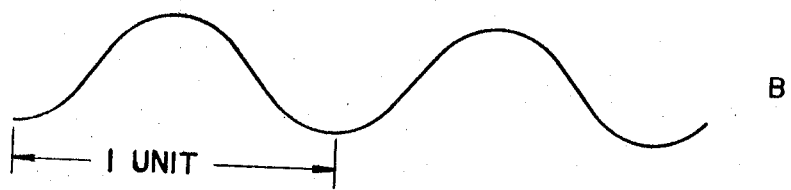
B
1 UNIT
FIG_4B
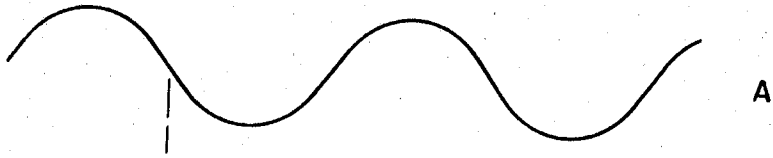
A
FIG_4C
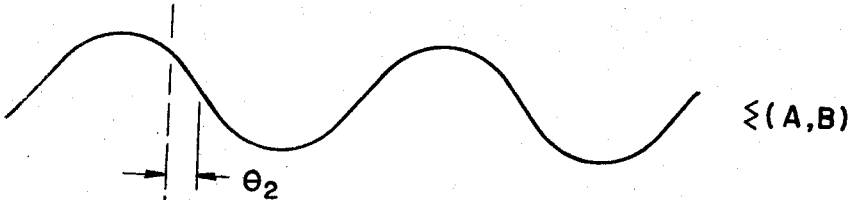
$\xi(A,B)$
$\theta_2$
FIG_4D
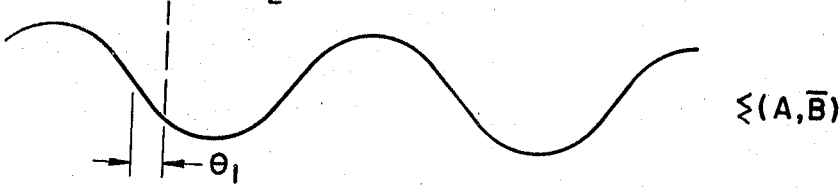
$\xi(A,\bar{B})$
$\theta_1$
FIG_4E
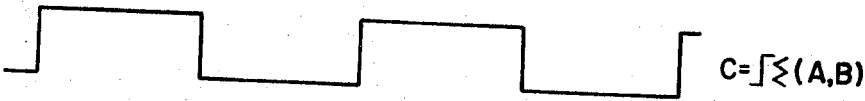
$C = \int \xi(A,B)$
$D = \int \xi(A,\bar{B})$
FIG_4F
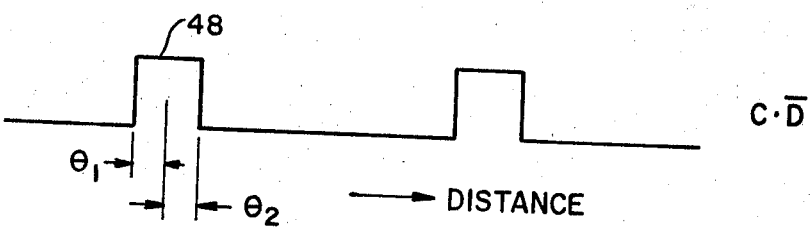
$C \cdot \bar{D}$
48
$\theta_1$ $\theta_2$ → DISTANCE
FIG_5
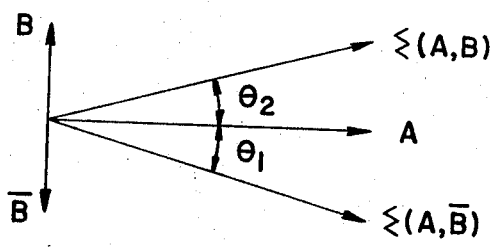
INVENTOR.
ANDREW GABOR
BY *Flehr, Hohbach, Test,
Albritton & Herbert*
ATTORNEYS 3,663,880

APPARATUS FOR CONTROLLING THE RELATIVE POSITION BETWEEN TWO RELATIVELY MOVABLE MEMBERS

BACKGROUND OF THE INVENTION

The present invention is directed in general to apparatus for controlling the relative position between two relatively movable members and more particularly for stopping such movement.

It is necessary in many systems to bring a movable member to a stop at a precise location. One such system includes a magnetic memory disk unit having rotatable magnetic disks with a number of tracks of possible information. When writing on a track or reading out, the writing or reading head must be positioned over that particular track of the disk. A copending application entitled "Apparatus for the Measurement of Relative Velocity Between Two Relatively Movable Members," Ser. No. 23,569, filed Mar. 30, 1970 in the name of Andrew Gabor and assigned to the same assignee as the present application discloses a velocity control system for the read/write heads. This patent application also discloses the necessity of bringing the heads to an accurate stop over a track.

In bringing the heads to an accurate stop over the desired information track on the memory disk, elaborate mechanical apparatus has heretofore been utilized. This apparatus besides being complex could not quickly and accurately bring a head to a stop over a predetermined track in a minimum time along with a minimum strain to the associated mechanical system. Further, in earlier systems the logic employed in ascertaining that the motion was approaching the desired stopping point was direction sensitive and utilized velocity signals to distinguish the positioning or "homing" region depending on the direction of approach to it.

OBJECTS AND SUMMARY OF THE INVENTION

It is, therefore, a general object of the invention to provide improved apparatus for controlling the relative position between two relatively movable members.

It is a more specific object of the invention tO provide apparatus as above which brings such members to a stop at a precise point.

It is another object of the invention to provide apparatus as above which is especially suitable for use in a magnetic memory disk unit and the read/write heads thereof for bringing such heads to an accurate stop over a desired track of the memory disk.

It is another object of the invention to provide apparatus as above which is simple in construction and produces no undue dynamic stresses or strains on the associated mechanical system in bringing one member to a stop with relation to the other, and that establishes the location of the homing region through logical processing of position signals only.

In accordance with the above objects there is provided apparatus for controlling the relative position between two relatively movable members comprising transducer means coupled to the movable members for producing two cyclic position signals displaced in space phase from each other each cycle of the signals being indicative of a predetermined unit of relative movement of the members. Motor means provide the change in relative position between the movable members. Control means are coupled to the transducer means and are responsive to the position signals and a reference signal to cause the motor means to stop the relative movement at the end of a predetermined unit of movement.

BRIEF DESCRIPTION OF THE DRAWINGS

FIG. 1 is a block circuit diagram illustrating the overall system of the present invention;

FIGS. 2A, 2B and 2C are diagrams and waveforms useful in understanding the invention;

FIG. 3 is a circuit schematic showing in detail a portion of FIG. 1;

FIGS. 4A through 4F are waveforms useful in understanding the invention; and

FIG. 5 is a diagram useful in understanding the invention.

DETAILED DESCRIPTION OF THE PREFERRED EMBODIMENT

FIG. 1 illustrates the overall system of the present invention which in its preferred embodiment is used in a closed loop servo system for positioning the heads 11 present in the standard computer disk unit 12. It is well known in the art that unit 12 would normally consist of one or more disks upon which binary information may be magnetically recorded in a number of circumferential tracks of discretely decreasing radii. Thus, to read and write on the disk 12 the head loading mechanism 13 must be accurately driven by motor 14 over each of the tracks and the head must come to a complete stop over such tracks. Motor 14 is indicated merely as having a shaft 16 driving the head loading mechanism 13 but in one embodiment a rack and pinion arrangement would be utilized. The heads 11 are moved to and fro by means of servo motor 14. Thus, the rotation of shaft 16 is an indication of the linear movement of heads 11.

Means for sensing the rotary position of shaft 16 includes a transducer unit 17 which is supplied high frequency signals by a coupled oscillator 18. Transducer 17 has two outputs designated A', B' which when demodulated by demodulators 19 and 20 provide the signals A and B as also illustrated in FIGS. 4A and 4B. These are known as cyclic position signals and in the preferred embodiment are substantially sinusoidal and are displaced 90° in space phase from each other. Moreover, as illustrated in FIGS. 4A and 4B one cycle of the signal is representative of one unit of relative movement of shaft 16 and of head 11 which is the distance between the tracks of a disk 12.

The details of transducer unit 17 and the method of generation of quadrature signals A and B are clearly disclosed in the above-mentioned copending application. In general, however, transducer 17 includes a disk with deposited metallic parallel conductors with each conductor carrying current in a direction opposite to the adjacent conductor. The other disk of the transducer is formed of similar conductors and is coupled to oscillator 18. Relative movement of one disk with respect to the other produces a position signal in a manner well known in the art and multiple windings are used to provide the two position signals A, B which are displaced in space phase.

The general operation of the invention is shown in FIG. 2A. From a starting position at the origin, motor 14 is accelerated to a maximum velocity at a level 21 and decelerated in steps 22 and 23 until the heads are in proximity to the track. At the point designated "homing region" motor 14 is gradually decelerated until it is exactly over the proper track location. The present invention is directed to apparatus for producing this homing region.

FIG. 2B illustrates the position signal "A" in the time domain during the operation described in FIG. 2A; the signal while in the high velocity level 21 has periods which are relatively closely spaced and which begin to broaden out at level 22, are longer in level 23 and gradually the position signal decreases to zero at the end of the homing region as shown.

From the foregoing it is obvious that a critically damped type system is preferred to reduce overshoot of the track position, thereby minimizing settling time.

Referring again to FIG. 1, as disclosed in the above-mentioned copending application the position signals A and B are coupled to a velocity logic unit 26 which is coupled to a summing network 27 and produces a velocity signal designated "E" which is derived as discussed in the above copending application from position signals A and B which are inverted, differentiated and commutated by the logic unit 26. Velocity signal E is coupled directly to summing network 27.

A velocity reference signal F is also provided from position signals A and B by means of a commutator unit 29 which is coupled to summing network 27 through a level control unit 31. The level control unit 31 is directed by a master control logic unit (not shown) to the desired velocity level shown in FIG. 2A. It is apparent that a difference between the velocity reference signal level F and the velocity signal level E produces an error signal on line 32 to cause a motor driver unit 33 to drive motor 14 accordingly. Thus, adjustment of level control unit 31 provides the various velocity levels 21, 22 and 23 as illustrated in FIG. 2A. A controlled inverter 34, which is responsive to a direction input, is coupled to motor driver 33 to rotate the drive motor 14 in a clockwise or a counterclockwise direction depending on the direction input.

In accordance with the invention control means are coupled to transducer 17 and are responsive to position signals A and B and a reference signal to cause the motor 14 to stop the relative movement of head 11 with respect to disk 12 at the end of a predetermined unit of movement which in the preferred embodiment would be over a track. Such means include a control logic unit 36 which has as inputs the position signals A and B and the inverted position signal $\bar{B}$. The reference signal input to control logic 36 is shown as a difference count. The output 37 of logic unit 36 is coupled to summing network 27 so that position signal A may serve as a position error signal in the homing region when the difference count is zero.

Details of control logic unit 36 are illustrated in FIG. 3 where the summing network 27 is merely a common conductor. Position signal A is coupled to an amplifier 41 which has as a second input the position signal B through an attenuator 42. Amplifier 41 is a summing and squaring amplifier which has an output designated C which is shown in FIG. 4E. In other words, amplifier 41 sums the waveforms of position signals A and B as shown in FIG. 4C causing an attendant shift in phase designated $\theta_2$ between that waveform and the waveform of FIG. 4C and that of 4B and this is squared by amplifier 41 (see FIG. 4E) which, for example, may include a Schmitt trigger circuit.

Similarly, the amplifier 43 is coupled to position signal A and also to the inverted position signal B through an attenuator 44 to produce an output designated $\bar{D}$ also illustrated in FIG. 4E in an uninverted form. The unsquared summation of A and $\bar{B}$ as illustrated in FIG. 4D produces a phase shift $\theta_1$ in the opposite direction as $\theta_2$ with relation to the zero crossing of the position signal A in FIG. 4B. Summation of the C and $\bar{D}$ signals by AND-gate 46 produces a symmetrical logic signal illustrated in FIG. 4F which has a portion 48 centered about the zero crossing of position signal A one-half of centered portion 48 leading by $\theta_1$ and the other half lagging by $\theta_2$.

It is apparent from examination of FIG. 5 that by adjustment of attenuators 42 and 44 of FIG. 3 the angles $\theta_1$ and $\theta_2$ may be modified as desired. An unambiguous range of 0° to 180° is possible. In the preferred embodiment shown in FIGS. 4A and 4B, A and B are equal in amplitude and attenuators 42 and 44 are set for 1:1 ratio to thus produce a $\theta_1$ equal to $\theta_2$ equal to 45°. Thus, the symmetrical logic signal illustrated in FIG. 4F provides a logic portion or window 48 centered around the zero crossings of position signal A.

From a physical standpoint the angle of $\theta_1$ and $\theta_2$ being equal to 45° is equal to one-eighth of the distance between two tracks on the memory disk since one space period is equal to 360° and this is the distance as defined above between two tracks.

In order to predetermine the track on which the head must land, external control units memorize the present track on which the head is located and then instruct by means of the difference count how many tracks away the head must move to reach the new track. This initial difference count as illustrated in FIG. 3 is stored in a difference counter 47. The counter is also coupled to the output of AND-gate 46 which is the C · $\bar{D}$ signal and is responsive to the centered logic portions 48 (see FIG. 4F) of the logic signal to count the number of tracks over which the head is passing. It is apparent that every appearance of a leading edge of the centered logic portion 48 of FIG. 4F indicates another track and decrements the counter by one count. When the number of tracks passed over is equal to the stored difference count, the decoded counter output is logical zero as determined by decoding gate 50. An inverted output signal is coupled from gate 50 to an AND-gate 51. The other coincidence input of AND-gate 51 is the output signal from AND-gate 46 which indicates the center logic portion 48 of the symmetrical logic signal. At the coincidence of these two signals, gate 51 produces an output on line 53 which closes the field effect transistor gate 54 to couple position signal A to motor driver 33. At the same time the output from gate 50 is inverted by inverter 49 and opens a field effect transistor gate 52 to eliminate the velocity reference signal "F" in the motor driver unit. Note, however, that the velocity signal, "E," is still maintained to provide stability in the servo system.

The use of field effect transistors 54 and 52 is ideal for the switching of analog signals 3 F" and "A" by digital logic signals. This is because of the field effect transistors' freedom from voltage offsets and their insensitivity to analog signal polarity.

Thus, the present invention causes the motor to stop at the end of its present unit of movement as illustrated in FIG. 2C at a place that is substantially over the track. Moreover, the symmetrical nature of the logic signal of FIG. 4F allows use of the present invention for either clockwise or counterclockwise rotation. Thus, the invention automatically accommodates itself to either direction of rotation. In addition, depending on the specific application the size of the homing region can be adjusted by changing the relative magnitude and polarity of the A and B position signals.

Furthermore, the logic signal of FIG. 4F is generated completely by simple logical processing of the squared sum and difference of the position signals. This represents a significant simplification over previous control methods.

It is also apparent that if finer control of the device is needed in a system for example with more closely spaced tracks, that every zero crossing of the position signal could be used; in other words, the unit of distance would be one-half cycle.

Thus, the present invention provides an improved apparatus for controlling the relative position between two members which is automatically responsive to bidirectional movement of such members and is reliable and simple in construction and operation.

I claim:

1. Apparatus for controlling the relative position between two relatively movable members comprising: transducer means coupled to said movable members for producing two cyclic position signals displaced in space phase from each other each cycle of said signals being indicative of a predetermined unit of relative movement of said members; motor means for providing a change in said relative position between said two movable members; logic means coupled to said transducer means and responsive to said two cyclic position signals to provide a logic signal centered on a predetermined point of one of said cyclic position signals corresponding to the end of said unit of movement; and control means coupled to said transducer means and responsive to said logic signal and a reference signal to cause said motor means to stop said relative movement at the end of a predetermined unit of movement.

2. Apparatus as in claim 1 in which said position signals are in space quadrature.

3. Apparatus for controlling the relative position between two members relatively movable in two directions comprising: transducer means coupled to said movable members for producing at least one cyclic position signal each cycle of said signal being indicative of a predetermined unit of relative movement of said members; counter means for counting said cycles of said cyclic position signal and providing an output signal in response to a predetermined number of cycles being counted; logic means coupled to said transducer means and responsive to at least said one cyclic position signal to provide a symmetrical logic signal centered on a predetermined point of said cyclic position signal corresponding to the end of said unit of movement; motor means for providing the change in relative position between said two movable members; and gating means responsive to the coincidence of the centered portion of said logic signal and said output signal of said counter means for coupling said position signal to said motor means to cause said motor means to stop said relative movement at the end of the present unit of movement, whereby said movement may be automatically stopped at the end of a unit of movement with said members moving in either of said two directions.

4. Apparatus as in claim 3 where said counter means is a difference type counter which is preset to a predetermined number and provides said output signal in response to an equivalent number of cycles being counted.

5. Apparatus as in claim 3 where said position signal is electrical and has a substantially sinusoidal waveform.

6. Apparatus as in claim 3 where said logic means is coupled to said counter means and said symmetrical logic signal drives said counter means to produce said output signal.

7. Apparatus as in claim 3 where said gating means includes field effect transistor switching means responsive to said coincidence for coupling said position signal to said motor means whereby said analog position signal is controlled by said digital logic signal.

8. Apparatus as in claim 3 where said logic means is responsive to two of said position signals which are displaced from each other in space phase.

9. Apparatus as in claim 8 where said logic means includes means for inverting one of said position signals, means for summing the other position signal with both said inverted and uninverted one position signal and means for squaring and logically ANDing the two resultant summed signals for providing said symmetrical logic signal centered on a zero crossing of said other position signal.

10. Apparatus as in claim 9 where said logic means includes means for squaring said summed position signals.

11. Apparatus as in claim 9 for attenuating one of said position signals relative to the other, whereby the width of the centered portion of said symmetrical logic signal may be predetermined.

* * * * *

Disclaimer and Dedication 3,663,880.—*Andrew Gabor*, Danville, Calif. APPARATUS FOR CONTROLLING THE RELATIVE POSITION BETWEEN TWO RELATIVELY MOVABLE MEMBERS. Patent dated May 16, 1972. Disclaimer and dedication filed June 21, 1978, by the assignee, *Xerox Corporation*.

Hereby disclaims and dedicates to the Public the entire remaining term of said patent.

[*Official Gazette October 3, 1978.*]